(12) United States Patent
Horiguchi et al.

(10) Patent No.: US 7,314,894 B2
(45) Date of Patent: *Jan. 1, 2008

(54) RUBBER COMPOSITION AND PNEUMATIC TIRE USING THE SAME

(75) Inventors: Takuya Horiguchi, Kobe (JP); Akira Minakoshi, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 229 days.

This patent is subject to a terminal disclaimer.

(21) Appl. No.: 10/625,591

(22) Filed: Jul. 24, 2003

(65) Prior Publication Data

US 2004/0019135 A1  Jan. 29, 2004

(30) Foreign Application Priority Data

Jul. 25, 2002  (JP) .............................. 2002-216569

(51) Int. Cl.
*C08L 3/00* (2006.01)

(52) U.S. Cl. ............................ 524/47; 524/52; 524/571

(58) Field of Classification Search ................. 524/47, 524/52, 571
See application file for complete search history.

(56) References Cited

U.S. PATENT DOCUMENTS 4,082,131 A    4/1978   Scheller 5,672,639 A *  9/1997   Corvasce et al. .............. 524/52
2002/0026003 A1* 2/2002  Tahara et al. ................ 524/494

FOREIGN PATENT DOCUMENTS

| EP | 0-795-581 A1 | 9/1997 |
|---|---|---|
| EP | 1-297-973 A1 | 4/2003 |
| JP | 10-17713 A | 1/1998 |
| JP | 11-157303 A | 6/1999 |
| JP | 2000-38480 A | 2/2000 |
| JP | 2000168315 A | 6/2000 |
| JP | 2002-30183 A | 1/2002 |
| JP | 2003-105131 A | 4/2003 |
| WO | WO 01-49786 A | 7/2001 |

\* cited by examiner

*Primary Examiner*—Peter D. Mulcahy
(74) *Attorney, Agent, or Firm*—Birch, Stewart, Kolasch & Birch, LLP

(57) ABSTRACT

The present invention provides a rubber composition which can sufficiently improve performance on ice and snow and wet gripping properties, and a pneumatic tire using the same. The rubber composition comprises, based on 100 parts by weight of diene rubber (A), 2 to 20 parts by weight of short fiber (B) having an average fiber diameter of 10 to 100 μm and average fiber length of 0.01 to 4 mm, 1 to 10 parts by weight of particles (C) having a Moh's hardness of at least 5 and average particle size of at most 500 μm, and 1 to 15 parts by weight of starch/plasticizer composite material (D), and the pneumatic tire has a tread made of the rubber composition.

13 Claims, No Drawings

RUBBER COMPOSITION AND PNEUMATIC TIRE USING THE SAME

BACKGROUND OF THE INVENTION

1. Field of the Invention

The present invention relates to a rubber composition which can sufficiently improve performance on ice and snow and wet gripping properties, and a pneumatic tire having a tread made of the rubber composition.

2. Description of the Related Art

Heretofore, when automobiles are driven in winter in a cold region with heavy snowfall, studded tires with spikes are used or chains are wound around a tire to ensure safety on snowy and icy road. However, studded tires or chain-equipped tires easily cause abrasion and damage of the road surface and dust is produced therefrom, resulting in air pollution and this was a significant environmental problem.

As a result, in order to solve the problems of safety and environment studless tires which exhibit certain braking performance and steering properties on ice and snow without spikes and chains have been rapidly developed.

As a studless tire, automobile tires having improved performance on ice by compounding sand (JP-A-61-150803) or metallic fibers (JP-A-63-34026) into the tread rubber are suggested. However, in such tires, hardness of the rubber becomes relatively high, and therefore friction on ice is insufficient. In addition, as tire wears off, those sand, metallic fibers and other metals fall off and the particles are spattered to cause a serious environmental problem of dust pollution.

Alternatively, using foamed rubber for the tread rubber is proposed (JP-A-62-283001, JP-A-63-9042 and JP-A-1-118542). However, in these tires, though frictional force on ice and snow is improved, edge effect and drainage effect from closed cells cannot be fully utilized due to low block stiffness of the foamed rubber and also, abrasion resistance and steering properties on dry road are inferior. Moreover, since foaming is conducted in the vulcanization step of the production, dimensional accuracy tends to be poor.

Also, techniques of improving tire performance on ice and snow by compounding hollow particles in the tread are proposed (JP-A-11-35736 and JP-A-6-328906). However, in these tires, fine hollow particles break when kneading, resulting in the problem that sufficient performance on ice and snow cannot be obtained.

Furthermore, techniques of improving performance on ice and snow by compounding a water-absorbing synthetic polymer in the tread rubber and removing water existing between the road surface and the tread are proposed (JP-A-5-148390). However, the water absorbing ability of synthetic polymer is insufficient and also the edge effect after falling of polymer is insufficient because polymer is difficult to fall immediately after water absorption.

In addition, a method of improving gripping properties on ice by increasing digging friction by compounding and orientating short fiber in the direction perpendicular to the tread surface is proposed (JP-A-2000-168315). According to these techniques, the gripping properties on ice of studless tires improved but not yet comparable to that of studded tires.

Also in a region which has melting of snow, wet gripping properties are also required for studless tires but in the conventional method of preparing a studless tire, gripping properties on wet roads of rainwater and snow melting water are insufficient.

SUMMARY OF THE INVENTION

The object of the present invention is to provide a rubber composition which can sufficiently improve performance on ice and snow and wet gripping properties, and a pneumatic tire using the same.

The above problems were found to be solved by compounding short fiber, particles having a Moh's hardness of at least 5 and a starch/plasticizer composite material to a rubber composition.

That is, the present invention relates to a rubber composition comprising, based on 100 parts by weight of diene rubber (A), 2 to 20 parts by weight of short fiber (B) having an average fiber diameter of 10 to 100 μm and average fiber length of 0.01 to 4 mm, 1 to 10 parts by weight of particles (C) having a Moh's hardness of at least 5 and average particle size of at most 500 μm, and 1 to 15 parts by weight of a starch/plasticizer composite material (D).

The above rubber composition preferably contains 4 to 12% by weight of a silane coupling agent (E) based on the total weight of starch/plasticizer composite material (D).

The present invention also relates to a pneumatic tire having a tread comprising the rubber composition.

DETAILED DESCRIPTION

The rubber composition of the present invention comprises diene rubber (A), specific short fiber (B), specific particles (C) and specific starch/plasticizer composite material (D).

Examples of diene rubber (A) are natural rubber (NR), isoprene rubber (IR), butadiene rubber (BR) and styrene-butadiene rubber (SBR) and these may be used alone or by in a combination of two or more kinds.

The rubber composition of the present invention can improve gripping properties on ice and snow as short fiber (B) is compounded. In particular, when short fiber (B) is oriented perpendicularly to the tread surface, digging friction is further improved and therefore gripping properties on ice and snow are enhanced.

Examples of short fiber (B) are glass fiber, aluminum whisker, polyester fiber, nylon fiber, polyvinylformal fiber and aromatic polyamide fiber. Of these, short fiber having a specific gravity of at least 2.0, such as glass fiber and aluminum whisker which have a superior dispersion in the rubber when kneading, appropriate shaping by kneading and excellent orientation are preferable.

The Moh's hardness of short fiber (B) is preferably 3 to 6. When the Moh's hardness is less than 3, the digging effect on icy roads tends to be insufficient. When the Moh's hardness is more than 6, the surface of short fiber is difficult to be scratched by the particles mentioned below. More preferably, the lower limit of the Moh's hardness of the short fiber (B) is 4 and the upper limit is 5.

The average fiber diameter of short fiber (B) after dispersing in the rubber composition is 10 to 100 μm. When the average fiber diameter is less than 10 μm, the flexural strength is insufficient and a sufficient digging effect cannot be expected. When the average fiber diameter exceeds 100 μm, the contact area between rubber and the ice surface decreases and therefore the adhesion effect tends to decrease. Also, reinforcement property becomes poor and abrasion resistance decreases. The lower limit of the average fiber diameter of short fiber (B) is 15 μm and the upper limit is 70 μm.

The average length of the short fiber (B) after dispersing in the rubber composition is 0.01 to 4 mm. When the average length is shorter than 0.01 mm, orientation becomes difficult and when the average length is longer than 4 mm, the viscosity of unvulcanized rubber increases and processability tends to decrease. Preferably the lower limit of the average fiber length of short fiber (B) is 0.2 mm and the upper limit is 2 mm.

The amount of short fiber (B) is preferably 2 to 20 parts by weight based on 100 parts by weight of diene rubber (A). When the amount of short fiber (B) is less than 2 parts by weight, the digging effect is insufficient and performance on ice and snow decreases. When the amount of short fiber (B) is more than 20 parts by weight, abrasion resistance decreases. Preferably the lower limit of the amount of short fiber (B) is 4 parts by weight and the upper limit is 15 parts by weight.

Particle (C) is obtained from a material having a Moh's hardness of at least 5. In the step of kneading short fiber (B) and particles (C) with rubber, by the friction of short fiber (B) and particles (C), small scratches are formed on the surface of short fiber (B). By this, short fiber (B) presumably becomes difficult to fall out of the rubber which is the base material. Therefore, when the Moh's hardness is less than 5, scratches on the surface of short fiber (B) are difficult to be formed and so the effect on digging friction becomes small. Preferably the lower limit of the Moh's hardness of the material of particle (C) is 6 and the upper limit is 8. When the Moh's hardness exceeds 8, asphalt roads may be damaged.

The Moh's hardness is one of the mechanical characteristics of materials and widely used in the field of minerals. In this measuring method, when scratch is found in a mineral scratched by another mineral, the hardness of the mineral is determined to be lower than the mineral used to scratch, when scratched in the following order of 10 minerals. From the lowest hardness, 1 talc, 2 gypsum, 3 calcite, 4 fluorite, 5 apatite, 6 orthoclase, 7 crystal, 8 topaz (yellow sapphire), 9 corundum and 10 diamond are used.

Examples of materials having a Moh's hardness of at least 5 include hemimorphite, asbestos, manganese, apatite, nickel, glass, hornblende, feldspar, pumice, orthoclase, hematite, augite, iron oxide, high speed steel, toll steel, magnesia, iridium, pyrite, ruthenium, agate, chrome dioxide, garnet, steel, flint, quartz, silicon, chrome, beryllia, zirconia, iridosmium, tourmaline, andalusite, beryl, emery, osmium, topaz, tungsten (sintered), zirconium boride, corundum, titanium nitride, tungsten carbide, tantalum carbide, zirconium carbide, chrome, alumina (cast), alumina (α), alumina (fine crystal), silicon carbide (black), silicon carbide (green), aluminum boride, boron carbide and diamond. Among these, inorganic substances such as pumice, quartz and emery are preferable from the viewpoint of providing particles of the desired particle size and low cost. However, both organic and inorganic materials can be used without particular limitation.

The average particle size of particle (C) is at most 500 μm. When the average particle size is more than 500 μm, reinforcing property for the rubber is poor and abrasion resistance is adversely affected. The lower limit of the average particle size of the particle is 10 μm, more preferably 30 μm and the upper limit is 300 μm, more preferably 150 μm.

When the average particle size is less than 10 μm, the surface of the short fiber is difficult to be scratched and therefore the effect on digging friction tends to be inferior.

The amount of particle (C) is 1 to 10 parts by weight, preferably 1 to 8 parts by weight based on 100 parts by weight of the diene rubber (A). When the amount of particle (C) is less than 1 part by weight, the surface of the short fiber is difficult to be scratched and the effect on digging friction tends to be inferior. When the amount of particle (C) is more than 10 parts by weight, abrasion resistance tends to decrease.

The starch/plasticizer composite material (D) is a blend of starch and plasticizer. Generally, when mixing starch and plasticizer, relatively strong chemical and/or physical interaction is thought to exist between the starch and plasticizer. The rubber composition of the present invention has an effect of improving wet gripping properties as starch/plasticizer composite material (D) is compounded.

The starch mentioned above is usually a sugar chain comprising a repeat unit of amylose (anhydroglucopyranose unit bonded by a glucoside bond) and repeat unit of amylopectin which has a branched chain structure. An example is reserve polysaccharides derived from plants such as maize, potatoes, rice and wheat.

The plasticizer is used for lowering the softening temperature of starch and facilitating dispersion of starch to the rubber. Therefore, the softening point of the plasticizer is preferably sufficiently lower than that of starch. Specifically, a plasticizer having a softening point of less than 180° C., preferably less than 160° C. is used.

Examples of the plasticizer are ethylene-vinyl alcohol copolymer, ethylene-acetate-vinyl alcohol tercopolymer, ethylene-vinyl acetate copolymer, ethylene-glycidal acrylate copolymer, ethylene maleic anhydride copolymer, cellulose acetate and condensate of ester of dibasic organic acid and diol. One or more plasticizers may be contained in the composite material.

The composite of the starch and plasticizer can be prepared according to the mixing method well known to the person skilled in the art. For example, the method disclosed in U.S. Pat. No. 5,403,374 can be used.

The content of starch within starch/plasticizer composite material (D) is usually about 50 to about 400 parts by weight, preferably about 100 to 200 parts by weight based on 100 parts by weight of plasticizer.

The softening point of starch/plasticizer composite material (D) is generally about 110 to about 170° C.

The starch/plasticizer composite material (D) is preferably used in the form of flowable dry powder or dry pellet.

The amount of starch/plasticizer composite material (D) is 1 to 15 parts by weight based on 100 parts by weight of diene rubber (A). When the amount of starch/plasticizer composite material (D) is less than 1 part by weight, improvement of wet gripping properties is insufficient. When the amount of starch/plasticizer composite material (D) is more than 15 parts by weight, abrasion resistance tends to decrease.

The rubber composition of the present invention is obtained by kneading short fiber (B), particle (C) and starch/plasticizer composite material (D) with diene rubber (A) for 5 to 10 minutes. When the kneading time is shorter than 1 minute, dispersion of short fiber, particles and starch/plasticizer composite material into the rubber tends to be insufficient.

Furthermore, the rubber composition of the present invention preferably contains silane coupling agent (E).

As silane coupling agent (E), any silane coupling agent which has been used together with silica can be compounded. Examples thereof are bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptoethyltrimethoxysilane, 2-mercaptoethyltriethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3- trimethoxysilylpropyl-N,N-dimethylthiocarbamoyltetrasulfide, 3- triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazoltetrasulfide, 3- triethoxysilylpropylbenzothiazoltetrasulfide, 3- triethoxysilylpropylmethacrylatemonosulfide and 3-trimethoxysilylpropylmethacrylatemonosulfide. The silane coupling agent may be used alone or in combination of two or more. Of these, bis(3-triethoxysilylpropyl) tetrasulfide is preferable from the viewpoint of both coupling effect and costs.

In the rubber composition of the present invention, by compounding silane coupling agent (E), starch/plasticizer composite material (D), the silane coupling agent and polymer can be easily coupled with each other in the rubber composition and the respective properties can be demonstrated well. Therefore, in the rubber composition of the present invention, the amount of silane coupling agent (E) is preferably 4 to 12% by weight, more preferably 6 to 12% by weight based on the total weight of starch/plasticizer composite material (D). When the amount of silane coupling agent (E) is less than 4% by weight, abrasion resistance tends to decrease and when the amount of silane coupling agent (E) is more than 12% by weight, the costs may be too expensive.

In addition to the above components, additives and other components usually used for preparing rubber may be incorporated into the rubber composition of the present invention in a usual amount if necessary. Concrete examples of the additives and components are reinforcing agents (carbon black, silica); processing oils (paraffin processing oil, naphthene processing oil, aromatic processing oil); vulcanizing agents (sulfur, sulfur chloride compound, organic sulfur compound); vulcanization accelerators (guanidine, aldehyde-amine, aldehyde-ammonia, thiazole, sulfen amide, thiourea, thiuram, dithiocarbamate or xandate compound); crosslinking agents (initiators such as organic peroxide compound and azo compound, oxime compound, nitroso compound and polyamine compound); antioxidants (amine derivatives such as diphenylamine and p-phenylenediamine, quinoline derivatives, hydroquinoline derivatives, monophenols, diphenols, thiobisphenols, hinderedphenols and phosphorus acid esters); wax; stearic acid; zinc oxide; softeners; fillers; and plasticizers.

When compounding carbon black into the rubber composition of the present invention as a reinforcing agent, the nitrogen adsorption specific surface area ($N_2SA$) of carbon black is preferably 90 to 190 $m^2/g$ and DBP (dibutyl phthalate) oil absorption amount of carbon black is preferably 80 to 140 ml/100 g.

When compounding carbon black into the rubber composition of the present invention, the amount thereof is preferably 30 to 60 parts by weight based on 100 parts by weight of diene rubber (A). When the amount of carbon black is less than 30 parts by weight, sufficient abrasion resistance is difficult to obtain. When the amount of carbon black is more than 60 parts by weight, tread hardness increases and performance on ice and snow tends to decrease.

In the rubber composition of the present invention, performance on ice and snow and wet gripping properties are improved by compounding specific short fiber (B), specific particles (C) and specific starch/plasticizer composite material (D) into diene rubber (A).

The tire of the present invention is prepared according to the usual process using the above rubber composition for the tread. That is, the rubber composition without vulcanization is extruded into the shape of tread and formed into tread on a tire forming machine in a usual manner to obtain an unvulcanized tire. The unvulcanized tire is heated and pressurized in a vulcanizing machine to obtain a tire.

The present invention is explained in detail based on Examples below but not limited thereto.

The materials used in Examples and Comparative Examples are described below. Emery was obtained by pulverizing the bulk thereof and sieving the pulverized substance to select particles having a specified particle size.

Natural rubber (NR): RSS #3

Butadiene rubber (BR): UBEPOL BR150B available from Ube Industries, Ltd.

Carbon black: SHOWBLACK N220 available from Showa Cabot Co. Ltd. ($N_2SA$: 111 $m^2/g$, DBP oil absorption: 111 ml/100 g)

Glass fiber: available from Nippon Sheet Glass Co., Ltd. (average fiber diameter: 33 μm, average fiber length: 6 mm (before dispersing in the rubber), Moh's hardness: 5)

Emery: prepared for this experiment (average particle size: 100 μm, Moh's hardness: 7 to 8)

Starch/plasticizer composite material: Mater Bi 1128R available from Novamont Company (Starch/plasticizer weight ratio: about 1.5/1, plasticizer: poly(ethylene vinyl alcohol), weight ratio of amylose unit to amylopectin unit of starch: about ⅓, softening point: about 147° C.)

Silane coupling agent: Si69 (bis(3-triethoxysilylpropyl)tetrasulfide) available from Degussa Co.

Oil: Diana Process oil PS 32 available from Idemitsu Kosan Co., Ltd.

Wax: SUNNOC Wax available from Ouchi Shinko Chemical Industrial Co., Ltd.

Antioxidant: Santoflex 13 available from FLEXSYS CO.

Stearic Acid: KIRI available from NOF Corporation

Zinc oxide: Zinc Oxide Type 2 available from Mitsui Mining and Smelting Co., Ltd.

Sulfur: Sulfur available from Karuizawa Iou Kabushiki Kaisha

Vulcanization Accelerator: Nocceler NS available from Ohuchi Shinko Kagaku Kogyo Co., Ltd.

The evaluation method used in Examples and Comparative Examples are as defined below.

(1) Average Fiber Length of Glass Fiber in the Rubber

The rubber was sintered to separate glass fiber from the polymer component and the average fiber length was found by observing using a scanning electron microscope (SEM).

(2) Wet Gripping Property

A 195/65R15 size sample tire was mounted on a vehicle for traction test and μMax value was measured on a wet asphalt road at a rate of 64 km/h, inner pressure of 200 kPa and load of 4.8 kN. With the tire of Comparative Example 1 as the reference, the wet gripping property was evaluated from the index calculated from the following equation. The larger the index is the better the wet gripping property.

(μMax value of each Example)÷(μMax value of
Comparative Example 1)×100

(3) Performance On Ice and Snow

A sample tire was mounted on a Japanese front engine/rear wheel drive automobile with an engine size of 2000 cc. The brake stopping distance at a rate of 30 km/h on a board of ice was measured. With the tire of Comparative Example 1 as the reference, the performance on ice and snow was evaluated from the index calculated by the following equation. The larger the index the better the performance on ice and snow is.

(Brake stopping distance of Comparative Example 1)÷(Brake stopping distance of each Example)×100

(4) Abrasion Resistance

A sample tire was mounted on a Japanese front engine/rear wheel drive automobile. The groove depth of the tire tread after running a distance 4,000 km was measured and the distance driven at which the tire groove depth is decreased by 1 mm was calculated. With the tire of Comparative Example 1 as the reference, the abrasion resistance was evaluated from the index calculated by the following equation. The larger the index is the better the abrasion resistance.

(Distance driven at which the groove depth of each tire is decreased by 1 mm)÷(Distance driven at which the groove depth of the tire of Comparative Example 1 is decreased by 1 mm)×100

EXAMPLES 1 TO 3 AND COMPARATIVE EXAMPLES 1 TO 3

The compositions shown in Table 1 except for sulfur and vulcanization accelerator were kneaded by using a Banbury mixer for 5 to 10 minutes. Sulfur and the vulcanization accelerators were added to the kneaded composition and the mixture was kneaded at 80° C. for 5 minutes by using a twin-screw open roll. The mixture was vulcanized at 170° C. for 12 minutes to obtain a rubber composition. Tires were prepared by using the obtained rubber composition for tread according to the usual method. The obtained tires were evaluated as mentioned above. The results are shown in Table 1.

TABLE 1

|  | Ex. | | | Com. Ex. | | |
| --- | --- | --- | --- | --- | --- | --- |
|  | 1 | 2 | 3 | 1 | 2 | 3 |
| Composition (Part by weight) | | | | | | |
| NR | 70 | 70 | 70 | 70 | 70 | 70 |
| BR | 30 | 30 | 30 | 30 | 30 | 30 |
| Carbon black | 45 | 45 | 45 | 45 | 45 | 45 |
| Glass fiber | 10 | 10 | 10 | 10 | 10 | — |
| Emery | 5 | 5 | 5 | 5 | 5 | — |
| Starch/Plasticizer composite material | 5 | 10 | 5 | — | 20 | 5 |
| Silane coupling agent | 0.5 | 1 | — | — | 2 | 0.5 |
| Oil | 15 | 15 | 15 | 15 | 15 | 15 |
| Wax | 2 | 2 | 2 | 2 | 2 | 2 |
| Antioxidant | 2 | 2 | 2 | 2 | 2 | 2 |
| Stearic acid | 3 | 3 | 3 | 3 | 3 | 3 |
| Zinc Oxide | 5 | 5 | 5 | 5 | 5 | 5 |
| Sulfur | 1 | 1 | 1 | 1 | 1 | 1 |
| Vulcanization accelerator | 1.5 | 1.5 | 1.5 | 1.5 | 1.5 | 1.5 |
| Glass fiber in the rubber | | | | | | |
| Average fiber diameter (μm) | 33 | 33 | 33 | 33 | 33 | — |
| Average fiber length (mm) | 0.25 | 0.25 | 0.25 | 0.25 | 0.25 | — |

TABLE 1-continued

|  | Ex. | | | Com. Ex. | | |
| --- | --- | --- | --- | --- | --- | --- |
|  | 1 | 2 | 3 | 1 | 2 | 3 |
| Property | | | | | | |
| Wet gripping property | 108 | 113 | 105 | 100 | 113 | 103 |
| Performance on ice and snow | 102 | 102 | 102 | 100 | 103 | 90 |
| Abrasion resistance | 98 | 97 | 93 | 100 | 91 | 106 |

In Examples 1 to 3 in which specific amounts of specific glass fiber, particles and starch/plasticizer composite material were compounded to tread rubber, performance on ice and snow and wet gripping properties were improved with an acceptable decrease in abrasion resistance compared to Comparative Example 1 in which starch/plasticizer composite material was not compounded. Above all, in Examples 1 and 2 in which a specific amount of silane coupling agent is compounded, high wet gripping properties could be obtained and abrasion resistance hardly decreased compared to Comparative Example 1.

In Comparative Example 2, in which more than 15 parts by weight of starch/plasticizer composite material was compounded, the abrasion resistance decreased significantly though wet gripping properties improved.

In Comparative Example 3, in which the specific glass fiber and particles were not compounded, performance on ice and snow decreased.

According to the present invention, by using a rubber composition containing a specific short fiber, particles and starch/plasticizer composite material for tread, both the improvement in performance on ice and snow and improvement in wet gripping properties can be achieved without decreasing abrasion resistance.

What is claimed is:

1. A rubber composition comprising:
   based on 100 parts by weight of diene rubber (A),
   2 to 20 parts by weight of short fiber (B) having an average fiber diameter of 10 to 100 μm and average fiber length of 0.01 to 4 mm,
   1 to 10 parts by weight of particles (C) having a Moh's hardness of at least 5 and average particle size of 30 to 500 μm, and
   1 to 15 parts by weight of a starch/plasticizer composite material (D).

2. The rubber composition of claim 1, further comprising 4 to 12% by weight of a silane coupling agent (E) based on the total weight of said starch/plasticizer composite material (D).

3. A pneumatic tire having a tread comprising the rubber composition of claim 1.

4. A pneumatic tire having a tread comprising the rubber composition of claim 2.

5. The rubber composition of claim 1, wherein the short fiber (B) has a Moh's hardness of 3 to 6.

6. The rubber composition of claim 1, wherein the short fiber (B) has a Moh's hardness of 4 to 5.

7. The rubber composition of claim 1, wherein the short fiber (B) has an average fiber length of 0.2 to 2 mm.

8. The rubber composition of claim 1, which comprises 2 to 20 parts by weight of the short fiber (B).

9. The rubber composition of claim 1, wherein the particles (C) have a Moh's hardness of 6 to 8.

10. The rubber composition of claim 1, wherein the particles (C) have an average particle size of 30 to 300 μm.

11. The rubber composition of claim 1, which comprises 1 to 8 parts by weight of the particles (C).

12. The rubber composition of claim 1, further comprising 6 to 12% by weight of a silane coupling agent (E) based on the total weight of said starch/plasticizer composite material (D).

13. The rubber composition of claim 1, wherein the particles (C) have an average particle size of 30 to 150 μm.

* * * * *